United States Patent [19]

Oman et al.

[11] Patent Number: 4,635,186

[45] Date of Patent: Jan. 6, 1987

[54] DETECTION AND CORRECTION OF MULTI-CHIP SYNCHRONIZATION ERRORS

[75] Inventors: Price W. Oman, Rhinebeck, N.Y.; Mark A. Rinaldi, Wilsonville, Oreg.; Vito W. Russo, Kingston; Gregory Salyer, Woodstock, both of N.Y.

[73] Assignee: International Business Machines Corporation, Armonk, N.Y.

[21] Appl. No.: 506,488

[22] Filed: Jun. 20, 1983

[51] Int. Cl.⁴ .................. G06F 11/00; G06F 13/00
[52] U.S. Cl. ......................... 364/200; 371/62; 371/68
[58] Field of Search ... 364/200 MS File, 900 MS File; 371/16, 57, 68, 36, 71, 62

[56] References Cited

U.S. PATENT DOCUMENTS

| | | | |
|---|---|---|---|
| 3,242,465 | 3/1966 | Gloates | 364/200 |
| 3,462,742 | 8/1969 | Miller | 364/200 |
| 3,864,670 | 2/1975 | Inoue | 364/200 |
| 3,921,149 | 11/1975 | Kreis | 364/200 |
| 3,970,995 | 7/1976 | Baudouin | 364/900 |
| 4,021,779 | 5/1977 | Gardner | 364/200 |
| 4,130,866 | 12/1978 | Ono | 364/200 |
| 4,309,768 | 1/1982 | Ault | 371/68 |

FOREIGN PATENT DOCUMENTS 1225253  3/1971  United Kingdom .

Primary Examiner—Raulfe B. Zache
Assistant Examiner—Florin Munteanu
Attorney, Agent, or Firm—George E. Clark; Edwin Lester

[57] ABSTRACT

A uniprocessor if formed on plural independently controlled chips each including a primary instruction driven controller and a secondary error driven self-sequencing controller. Each instruction is supplied in parallel to each primary controller which generates an EXIT signal, as it completes execution, to a common external EXIT line. Hardware monitors the local EXIT signal and the common EXIT line state and activates the secondary controller, when a mismatch is detected, to set an on-chip reset predominant error latch driving a common external ERROR line, an ERROR-state on which also sets the latches and activates any inactive secondary controller to drive its chip to a first predetermined state and to reset its latch. When no ERROR signal remains, the secondary controllers cycle in synchronism through an ERROR routine, exiting to instruction control.

10 Claims, 5 Drawing Figures

DETECTION AND CORRECTION OF MULTI-CHIP SYNCHRONIZATION ERRORS

FIELD OF THE INVENTION

The present invention relates to uniprocessors which incorporate a plurality of functionally distinct processing modules adapted to cooperate in the execution of single instructions and to the preservation of intermodule synchronization therein.

BACKGROUND OF THE INVENTION

Traditionally a uniprocessor comprises a plurality of hardware elements individually controlled by signals generated by a control unit by decoding instructions under clock timing control. As more and more hardware elements can be accommodated on a chip or module, the availability of signal paths between chips or modules to accommodate control signals becomes critical, assuming plural chips or modules are required to provide the aggregate of functions desired. Obviously, the path problem disappears when all the function is accommodated in a single chip or module.

An approach to overcoming the control signal path problem is set forth in United Kingdom Patent Specification No. 1225253 which discloses a multi-module system which partly decodes an instruction in a common controller and completes the decoding independently in each module. Synchronization is obtained by feedback signals from the modules to the common controller which is counter driven, a full set of completion signals being required for the counter of the common controller to be advanced, many advances equaling one instruction. Each module has its own driving counter, selectively advanced by attainment of a particular count by the common controller counter.

Partly decoded control signals are smaller in number than fully decoded control signals but the signals, together comprising the instructions, per se, comprise the minimum control signal set and can be used, provided that full decoding is provided on each module rather than the partial decoding of the aforesaid specification. However, this introduces its own set of problems since the synchronizing control provided by a common controller with feedback, automatically disappears. To merely provide common clock timing is not sufficient since any error, looping or blockage in a module is not susceptible to correction by the action of clock timing alone. To decrease the transmitted control signal set and increase the intermodule feedback signals correspondingly is of no great advantage. Further, since a failed module is still, as far as it is concerned, satisfactorily digesting an instruction, externally applied instruction driven diagnostic tools will be effective only on good modules. What is required is a mechanism that will restore synchronism and/or external availability and which is inexpensive in required intermodule signal paths.

SUMMARY OF THE INVENTION

Accordingly, from one aspect, the present invention provides, in a uniprocessor comprising a plurality of functionally distinct processing modules, each said module decoding the current instruction independently of each other module and generating an EXIT signal as a terminal function of its execution of each instruction, a method of maintaining synchronism between said modules comprising performing, in each said module, the steps of monitoring the EXIT signal states of each other said module to detect generation of an incomplete set of EXIT signals on attainment of an EXIT state locally and in response to each detection, independently of the current instruction and of each other said module, self-sequencing to a predetermined nominal state.

From another aspect the present invention provides in a uniprocessor comprising a plurality of functionally distinct processing modules, each said module decoding the current instruction independently of each other said module and generating an EXIT signal as a terminal function of its execution of each said current instruction, a method of maintaining synchronism between said modules comprising performing, in each said module, the steps of monitoring the EXIT signal states of said modules to detect an incomplete set of said EXIT signals when generating a local said EXIT signal state self sequencing in response to a detected incomplete set of said EXIT signals and EXITING to instruction controlled program execution.

From another aspect, the present invention provides in a uniprocessor comprising a plurality of functionally distinct processing modules, each said module decoding the current instruction independently of each other module and generating an EXIT signal as a terminal function of its execution of each instruction, apparatus for maintaining synchronism between said modules comprising, an EXIT signal path interconnecting all said modules, a generating circuit in each said module for applying its own EXIT signal, when generated, to said EXIT signal path in such a way that send EXIT signal path states are logical functions of the exit signal states, monitoring circuitry in each said module for detecting inequality between said local exit signal state and said exit signal path state and self-sequencing means responsive to such inequality detection by the monitoring circuitry for forcing the local module into a predetermined nominal state, independently of any other of said modules, which state is independent of the current instruction.

From another aspect the present invention provides in a uniprocessor comprising a plurality of functionally distinct processing modules, each said module decoding the current instruction independently of each other said module and generating an EXIT signal as a terminal function of its execution of each instruction, wherein said EXIT signals are generated by an instruction dependant primary controller in and for each module, apparatus for maintaining synchronism between said modules comprising an EXIT signal distributing circuits connected to each said primary controller communicating EXIT signals, when generated, between said modules, detecting circuits in each said module connected to said EXIT signal distributing circuit and generating a significant output if said primary controller of said module is generating an EXIT signal and at least one other said module is not and a self-sequencing secondary controller in each module connected to the detecting circuit of that module and rendered active by a significant output from said attached detecting circuit.

From another aspect the present invention provides in a uniprocessor comprising a plurality of functionally distinct processing chips, each said chip decoding the current instruction independently of each other said chip and generating an EXIT signal as a terminal function of its execution of each instruction, wherein said EXIT signals are generated by an instruction dependant primary controller in and for each chip, apparatus for maintaining synchronism between said chips comprising an EXIT signal distributing circuit connected to each said primary controller communicating EXIT signals, when generated, between said chips said EXIT signal distributing circuit comprising a common EXIT signal line, a first inverting circuit connecting each of the primary controllers to said common EXIT signal line in such a way that said EXIT signal line is in one binary state if, and only if, all said primary controllers are generating EXIT signals and in the other binary state if any the primary controller is not generating an EXIT signal, a second inverting circuit connecting said common EXIT signal line to each detecting circuit in each chip, the detected circuit being connected to both the first and second circuits and generating a significant output if said primary controller of said chip is generating an EXIT signal and said common EXIT line is in said other binary state and a self-sequencing secondary controller in each said chip is connected to said detecting circuit of that chip and rendered active by a significant output from said attached detecting circuits to drive its chip to a predetermined normal state independently of said primary controllers.

It must be noted that the arrangement specified herein relates to uniprocessors, as such, even though such uniprocessors can be combined to form multiprocessor systems. The modules to be synchronized all cooperate in the execution of the same instruction without redundancy. It is distinguished from multiprocessors, in which different modules execute different instructions, and from redundant processors where each instruction is executed two or more times, simultaneously but independently, to hopefully ensure accurate results.

Thus, by way of example, one form of uniprocessor according to the invention includes three processing chips, one performing arithmetic and logic functions, one generating memory addresses and the third handling I/O communication, all three chips being driven by a common external clock and connecting to a common memory. Each instruction extracted from memory is applied in parallel to each chip and is decoded and executed internally of that chip, the aggregate of the decoded functions being that necessary and sufficient for execution of the instruction and each decoded function, if synchronism is preserved, being performed in its appropriate temporal position. One function per instruction for each chip is to generate an EXIT signal to an external EXIT line in such a way that the significant state of the EXIT line is the logical AND function of the three EXIT signal states. A comparator on each chip compares the local EXIT signal state with that of the EXIT line, the COMPARE UNEQUAL output of the comparator triggering a hardware controller which sets an error latch. All three error latches connect to an external error line such a way that one state of the ERROR line indicates that at least one chip is in an ERROR state. The ERROR Line state is fed back into each chip setting any error latch not already set and launching each hardware controller into a control sequence which drives its chip to a predetermined state whereat it issues and supplies a reset signal to the local ERROR latch (which is reset predominant and thus remains reset) and becomes quiescent. When all the ERROR latches are reset, the state of the ERROR line switches, signifying externally that the three chips have returned to synchronism and triggering, internally, the chips to perform further coordinated functions.

The present invention will be described further by way of example with reference to the aforesaid embodiment as illustrated in the accompanying drawings.

OVERVIEW

The present invention relates to any uniprocessor in which the hardware necessary for the execution of the native set of instructions is physically packaged in a plurality of separate modules, each instruction being supplied in parallel to each of the modules and independently decoded in each module. The architecture of the processor is immaterial and the distribution of function between the individual modules is also immaterial. Given an architecture and a function distribution, the nature of the decoding on each module follows automatically, as does the problem of preserving synchronism of the modules. It is not sufficient to merely provide common clocking.

Figure 1:
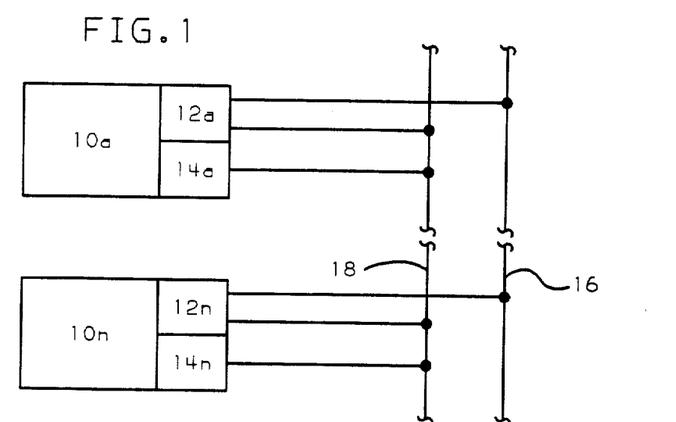
FIG. 1 is a simplified diagram of a generalized uniprocessor according to the present invention.
Figure 2:
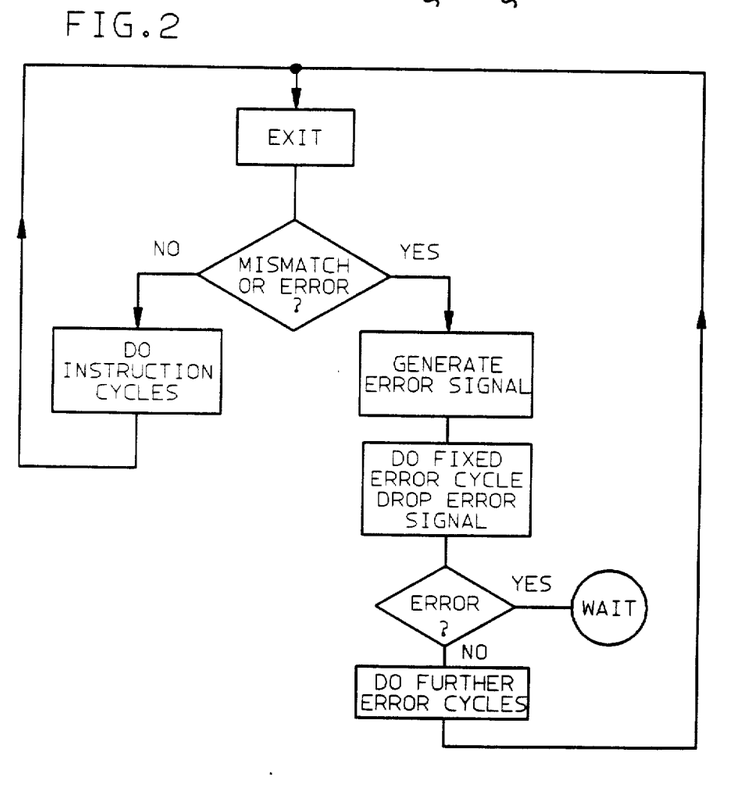
FIG. 2 is a simplified diagram of the operation of the processor of FIG. 1.

For the purposes of illustration only, and referring to FIGS. 1 and 2, a uniprocessor according to the present invention can be regarded as comprising a plurality of modules 10a to 10n, each including a primary controller 12a to 12n and a secondary controller 14a to 14n. The primary controllers 12a to 12n are connected to a system data bus 16 and the primary and secondary controllers are connected to a control bus 18. Each module 10a to 10n is constructed to perform a different function in such a way that the aggregate of the individual module functions is that which is necessary and sufficient to execute each and every instruction of the native instruction set of that processor. The current instruction is gated from the data bus 16 into each primary controller 12a to 12n. It is decoded independently in each primary controller, and, if the function of the module is appropriate to that instruction, the primary controller in that module generates the succession of control signals to drive the module. If the module function is not required, the controller maintains the module quiescent for the number of cycles required for execution of the instruction by the other module. Whether active or not, each primary controller 12a to 12n generates an EXIT signal when it deems the appropriate number of cycles to have expired. The collection of EXIT signals are gated onto the control bus 18 and are monitored by each secondary controller 14a to 14n to determine if the EXIT signal state generated by its associated primary controller matches the EXIT signal states on the control bus. If there is no match, the detecting secondary controller places an ERROR signal on the control bus. Each secondary controller 14a to 14n also monitors the control bus for ERROR signals. In response to detection of either an EXIT signal mismatch or an ERROR signal each secondary controller 14a to 14n generates its own ERROR signal, if not already doing so, and assumes control of its module from its associated primary controller which is prevented from receiving and decoding its notional next instruction. This is effectively a fixed branch as shown in FIG. 2 between an instruction determined processing cycle loop if there is no mismatch or ERROR and a hardware determined processing cycle loop if there is a mismatch and ERROR. Each secondary controller 14a to 14n is self-sequencing and requires no instruction to determine its operation. When active, each secondary controller causes its module to execute a fixed processing cycle at the end of which, it drops its own ERROR signal. No secondary controller proceeds beyond this fixed processing cycle, to the second processing cycle in the ERROR processing cycle loop until all ERROR signals on the control bus have ceased, denoting that all the modules are in synchronism. At the end of the ERROR processing cycle loop, assuming the loop exits satisfactorily, control is returned to program control and the primary controllers 12a to 12n.

The control bus 18 need only include two lines, one for a logical function of the EXIT signals and one for a logical function of the ERROR signals. Both logical function could be logical OR in which case, the module which has not EXITED will instigate ERROR cycling for all the modules. However it is preferred that the EXIT signal function be logical AND or its equivalent, so that any and all modules which have EXITED, will instigate ERROR cycling.

PREFERRED EMBODIMENT

A particular form of uniprocessor conforming to IBM 8100 Information System—Principles of Operation, manual GA 23-0031, fourth edition published November 1981, is described but only to the extent necessary for understanding of the invention. The processor is illustrated in block form in FIG. 3 and comprises, in addition to a conventional memory 20, a conventional input/output (I/O) subsystem 22 and a conventional console 24; three processing chips 26, 28, 30 (which correspond to the modules 10a to 10n of FIG. 1), a small random access memory 31 more readily referred to as "register space", and a storage control unit chip (SCU) 32, interconnected by a bus complex. Basically chip 26 is the arithmetic and logic unit (ALU) and is referred to as the PROC chip, chip 28 is the memory address generator and translator and is referred to as the MASS chip and chip 30 drives the I/O subsystem 22 and is referred to as the CHAN chip. The SCU chip directly controls the memory 20 and also incorporates the system clock generator and a programmable line out mechanism.

Figure 3:
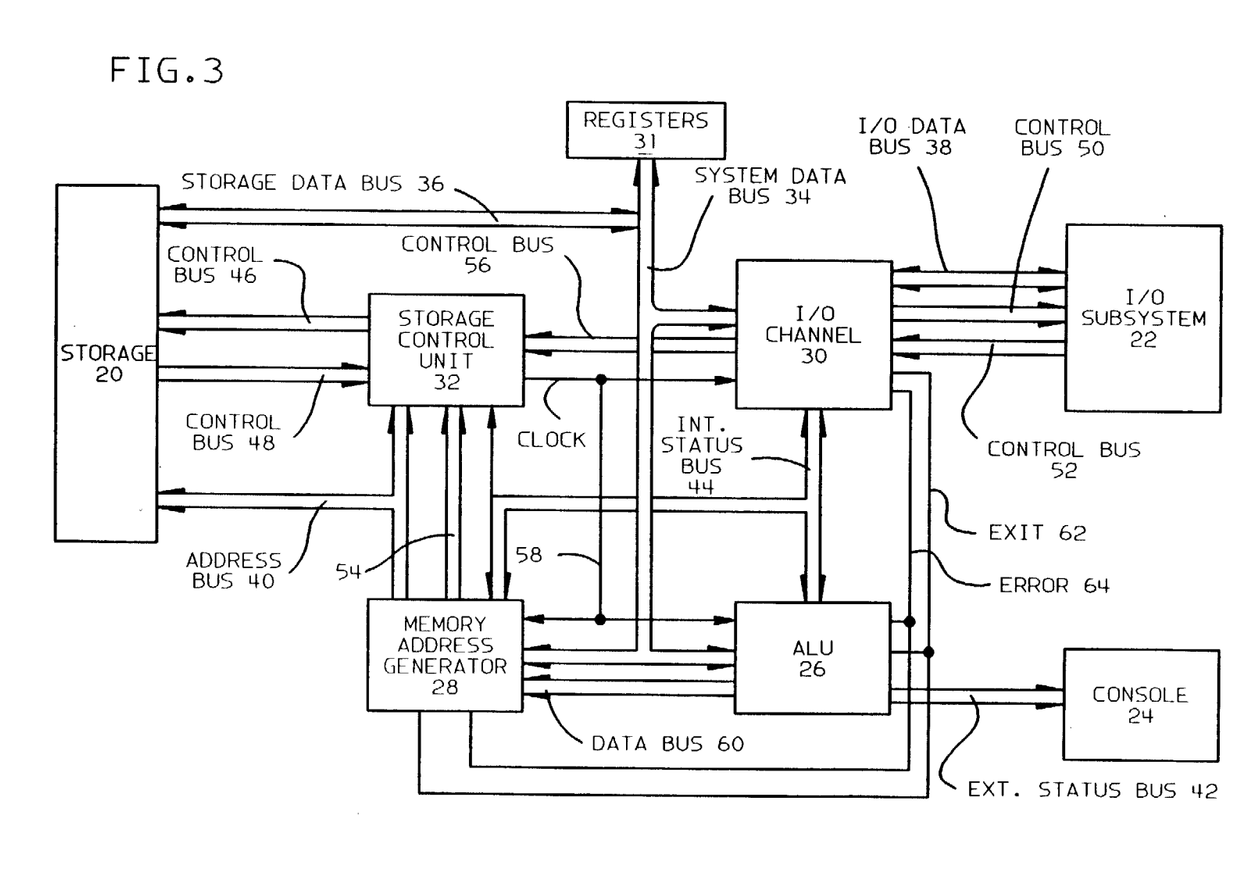
FIG. 3 is a block diagram of the physical structure of one preferred form of processor according to the present invention.

The bus complex is, for the most part, that which would be expected, namely:

(a) a bidirectional system data bus 34 interconnecting the three processing chips 26, 28 and 30 and the register space 31;
(b) a bidirectional storage data bus 36 interconnecting the system data bus 34 to the memory 20;
(c) a bidirectional I/O data bus 38 interconnecting the CHAN chip 30 and the I/O subsystem 22;
(d) a unidirectional address bus 40 connecting the MASS chip 28 both to the memory 20 and to the SCU chip 32;
(e) a unidirectional external status bus 42 connecting the PROC chip 26 to the console 24;
(f) a bidirectional internal status bus 44 interconnecting the three processing chips 26, 28 and 30 and having a undirectional connection to the SCU chip 32;
(g) undirectional control busses 46, 48, 50, 52, 54 and 56 respectively connecting the SCU chip 32 to the memory 20, the SCU chip 32, the CHAN chip 30 to the I/O subsystem 22, the I/O subsystem 22 to the CHAN chip 30, the MASS chip 28 to the SCU and the CHAN chip 30 to the SCU chip 32; and
(h) a clock line 58 connecting the SCU chip 32 to the three processing chips 26, 28 and 30.

In addition, there is a unidirectional data bus 60 connecting the PROC chip to the MASS chip, which is not pertinent to the present invention but which will be referred to hereinafter, and a pair of lines 62 and 64 shown separately but logically forming part of the internal status bus 44. These lines correspond to the control bus 18 of FIG. 1 and couple the three processing chips omnidirectionally and are referred to as an EXIT line 62 and an ERROR line 64. It is the relationship between the signal states on these two lines and local conditions internally of the individual PROC, MASS and CHAN chips which determines and controls the synchronizing of the chips at an instruction level.

At a sub-instruction level, assuming that the expected happens, the entire system is synchronized by the two system clocks produced by the system clock generator. The two system clocks are non-overlapping and comprise a source clock, which initiates data transfers onto the busses or into the combinatorial logic, and a sink clock, which controls the receipt of data from the busses or the latching of results. The source clock also initiates storage cycles of the memory by gating the addresses and control codes, the SCU chip 32 generating the timing signals required for accessing of the storage arrays of the memory and, if necessary, delays generation of the sink clock until completion of the current memory access. Thus, by varying the period of the system clock, the storage cycle is, prima facie, synchronized to the three chip cycles, together comprising the processor cycles. The execution of an instruction can occupy from one to five hundred and twenty two processor cycles, depending on the instruction, the mean instruction requiring four processing cycles to execute.

SYSTEM SUMMARY

An environment for program execution is defined in terms of the processing resources and the status information required for proper exeeution. Processing resources required for the program include registers and the set of addresses used for references to main storage. A program environment is described by two vectors of control information: a program status vector (PSV) and an address control vector (ACV).

In general, the PSV is used to control instruction sequencing, to define general register assignments, and to hold the status of the processor in relation to the program. The PSV that describes the program being executed is called the current PSV. If a different PSV is introduced as the current PSV, the state of the processor is changed; execution then proceeds using the description contained in the new PSV. When the current PSV is stored, the state of the executing program is preserved so that execution may later be resumed.

All addresses used by the program to refer to main storage are called logical addresses. These addresses are not used directly to refer to physical main-storage locations. The set of logical addresses that may be used by a program is called its logical address space. Each program can be assigned a distinct logical address space. The size of the logical address space is defined by an ACV.

An ACV is associated with each PSV; when a new PSV is introduced, a new ACV is introduced also. The new ACV describes the logical address space available to the program.

The dynamic address relocation and translation facilities are used to associate addresses in a logical address space with physical locations in main storage. ACV fields are used to control these address transformations.

The instruction address field of the PSV contains the logical address of the next instruction to be executed. The primary and secondary general-register sets assigned to the program are identified by two fields in the PSV. Other fields in the PSV include the condition indicators, the program mode, and the program information code.

The program information code is used chiefly to report information resulting from the monitoring of program exceptions by the processor. The condition indicators reflect the results of arithmetic, logical, and I/O operations.

To ensure the integrity of a supervisory program, instructions that alter Process Control Element (PCE) control information are not available for general use. Only those programs whose PSV specifies the appropriate authorization may use these instructions.

Registers are organized in register groups and register sets. Sixty-four sets of registers are provided in each of two register groups; each set consists of eight 32-bit registers numbered 0-7. One group of 64 register sets is known collectively as the principal register group. Of these, 16 sets are permanently assigned to hold control information, and the remaining 48 sets are available for use by programs as general-purpose registers. The second group of 64 register sets is known as the adjunct register group. Of these, 16 sets are permanently assigned to hold control information, and the remaining 48 sets are reserved.

A program has two sets from the principal register group assigned to it and, thus, can address information in 16 general-purpose registers. General-purpose registers can be used for addressing and to hold operands and results in arithmetic and logical operations. Of the two register sets assigned to a program, one is designated the primary set and the other the secondary set.

The main-storage addressing arrangement is based on a logical separation of the addresses used by the program from the addresses assigned to the physical locations in main storage. That is, the addresses used by the program are not used directly to refer to main storage. This separation can provide extensive storage protection and ease the task of storage management. The dynamic-address-transformation facilities are provided to associate logical addresses used by the program with physical locations in main storage.

An address space is a set of addresses used to refer to main storage. Byte locations are numbered consecutively staring with 0 and continuing to the largest address defined for the address space.

Each program can have assigned to it a logically distinct address space. Similarly, a logically distinct address space can be assigned to each channel I/O operation. These address spaces are called logical address spaces. All main-storage addresses used by the program or channel are treated as logical addresses.

The real address space is the set of addresses assigned to the physical locations in main storage. The largest in the real address space corresponds to the highest-numbered installed physical location.

Also defined is an address space which comprises the complete set of logical addresses provided by the processor. This address space is called the PCE address space. (The PCE address space is not the real address space which corresponds to physical storage locations.) The size specified for a logical address space cannot exceed the size of the PCE address space.

During program execution and channel I/O operations, the addresses in a logical address space are always dynamically relocated in the PCE address space. When dynamic address translation is not active, the relocated addresses are used as real addresses. When translation is active, a translation table is used to translate the relocated addresses into real addresses. The translation facility allows contiguous blocks of relocated addresses to be assigned to non-contiguous blocks of physical main storage.

The basic transformation of logical addresses is dynamic address relocation. Each logical address space is assigned a beginning location, called the origin address, in the PCE address space. The assigned size of the logical address space determines the maximum logical address that may be used by the program or channel I/O operation. The origin and size are represented by information placed in an ACV by the supervisory program.

During each use of a storage address, the dynamic-address-relocation facility tests the logical address. If it exceeds the maximum address in the logical address space, a program exception is indicated. If the logical address does not exceed the maximum, it is combined with the origin address to produce an address in the PCE address space. This process maps the contiguous addresses in a logical address space into a set of contiguous addresses in the PCE address space.

Because dynamic address relocation is applied on each storage reference, an address space may be logically moved to a different location in the PCE address space by changing its assigned origin. Further, the origin addresses may be chosen so that address spaces are nested for sharing of programs and data.

The ACV is 32 bits long and contains an origin field, a size field and a translation-control bit.

Storage management is further aided by the dynamic-address-translation facility. This facility allows a supervisory program to manage assignment of contiguous logical addresses to non-contiguous areas of main storage. More efficient use of installed main storage can be obtained by allocating fragments of real address space to one contiguous logical address space. Also provided with this facility are means for controlling access to storage.

For the purpose of address translation, the PCE address space and the real address space are both logically partitioned into equal-sized blocks. A block comprises 2,048 (2K) byte locations and begins at an address that is a multiple of 2048. When dynamic address translation is specified in the ACV, addresses in the PCE address space are not used directly to refer to locations in main storage. Instead, a translation table is provided which allows a supervisory program to associate blocks in the PCE address space with blocks of real addresses.

One translation table entry is provided for each block in the PCE address space. Each table entry is 32 bits long and contains a block-address field and a field for access control. The translation table entries are organized in the same sequence the blocks in the PCE address space; contiguous blocks in the PCE address space are associated with contiguous entries in the translation table. When dynamic address translation is active (bit position 31 of the ACV is 1), each address (after relocation) is used to locate the corresponding entry in the translation table. The block address in the table entry designates the block of main storage associated with the block of PCE address space.

During the translation process, each relocated address is treated as having two parts: a block index and a byte index. The block index portion is used as an index high-order bits of the corresponding real address, which are then concatenated with the byte index to form the complete real address.

The processor gives control to programs in response to requests for program execution. The functions performed to determine which program is to be given control are called dispatching functions, in response to requests which come from three sources:

Requests created by a program
Signals from I/O devices
Requests generated as a result of detecting certain errors The allocation of unique general-register sets from the group of principal register sets, and the definition of a logical address space, allow a supervisory program to establish a distinct execution environment for a program. Because a distinct environment is defined, the state of the program is automatically preserved when program execution is suspended and restored when the program is subsequently resumed.

Requests for program execution are serviced according to their relative priorities. Eight levels of priority are defined. The eight priority levels are numbered 0–7. Level 0 is defined as the highest priority, level 1 is defined as the next highest priority, and so on to level 7, which is defined as the lowest priority level. The priority level at which the PCE is executing instructions is called the current priority level.

The priority levels can be enabled or disabled for requests for program execution. When a priority level is enabled, programs associated with that priority level can be given control in response to a request. When a priority level is disabled, all requests for programs at that level remain pending until the level is enabled.

Whether priority levels are enabled or disabled is indicated and controlled by m bits in the master mask and the common mask. The two masks provide a hierarchy of control. The 1-bit master mask controls priority levels 1–7 as a group. The 8-bit common mask provides individual control for each of priority levels 0–7. The master mask takes precedence over the common mask.

A third mask, the 1-bit channel mask, determines whether channel input/output operations are enabled or disabled.

A program is given an execution priority by means of its PSV/ACV pair. Associated with each priority level are principal and adjunct register locations that are permanently assigned to hold PSV/ACV information. The register locations that hold a PSV and its paired ACV are uniquely associated with one priority level. Thus, the priority level at which a program executes is determined by the register locations in which its PSV/ACV pair is held.

Register locations for two PSV/ACV pairs are associated with each priority level; one is designated the primary PSV/ACV pair and the other is the secondary PSV/ACV pair. This dual PSV/ACV facility allows a supervisory program and an application program to execute a the same priority level. The primary PSV/ACV pair should normally be used for a supervisory program, and the secondary PSV/ACV pair can be used for any program.

PSV information is held in an even- and odd-numbered pair of consecutive registers in a principal register set. Corresponding to the register locations of a PSV is a register location in an adjunct register set. This adjunct register is permanently assigned to hold the corresponding ACV.

The dispatching mechanism operates in response to requests generated by a program, I/O devices, or detected errors. These requests for program execution can result in an interruption of the current program and the introduction of a new PSV/ACV pair. For this reason, the request for program execution is called an interrupt request. An interrupt request is always associated with a priority level and represents a request for execution of a program at a specific priority level.

Interrupt request from I/O devices are held in an I/O interrupt request vector (IOIRV). Requests created by the currently executing program are held in a programmed interrupt request vector (PIRV). In both the IOIRV and the PIRV, one bit position is defined for each of the eight priority levels. A request for program execution at a specific priority level is indicated by the bit associated with that level. For the purpose of indicating interrupt requests, an I/O device can be assigned to a priority level.

System checks result in a request for program execution at priority level 0 and are indicated in an error interrupt request vector (EIRV). The group of system checks includes machine checks, I/O checks, channel exceptions, and those program exceptions detected while a primary PSV is active (usually indicating an error in a supervisory program).

The procedure performed to select a priority level for program execution is called priority level dispatching. Conceptually, the procedure to select a priority level for program execution is repeated after every unit of operation. The entire execution of a non-interruptable instruction is a single unit of operation. For interruptable instructions, a unit of operation may consist of only partial execution of the instruction. Interrupted instructions are normally resumed automatically with the next unit of operation when the interrupted program is next given control.

The processor determines which priority levels are eligible for selection by combining all requests and excluding those associated with disabled priority levels. Normally an interrupt request for a given level must be present in order for program execution to take place at that level. A PSV/ACV pair associated with the highest enabled priority level having an interrupt request present is given control.

If the selected level is the same as the current level, program execution continues on the current level with the next unit of operation. In two cases, however, a new program is given control at the current priority level. The first of these is execution of the instruction CALL PSV, which introduces the opposite (dual) PSV/ACV pair for the same priority level (switches from the primary PSV/ACV pair to the secondary pair or from the secondary pair to the primary pair). The second case occurs when a program exception is encountered while a secondary PSV is active. In this case, the primary PSV/ACV pair for the current priority level is introduced. In both cases, the current level does not change even though a new PSV/ACV pair is introduced. An 8-bit control vector, the program activation vector (PAV), is updated to indicate which PSV/ACV pair is to be introduced when control is returned to the current level following an interruption.

If the selected level and current level are different, program execution at the current level is interrupted and the program at the selected level is given control. A new priority level is selected in the following cases:

When there is a request for program execution a level higher in priority than the current level, and the higher priority level is enabled.

When the request for program execution at the current priority level is removed or the current level is disabled, and another request is present that is associated with an enabled priority level.

The processor normally continues program execution at an enabled priority level only while an interrupt request is present for that level. The master mask can also be used to continue program execution at the current level even when no interrupt request is present for that level. When the request sustaining program execution on the current priority level is removed, program execution on that level is considered to be concluded at the completion of the current instruction.

The wait state is entered at the completion of the current instruction when program execution on the current priority level is concluded and no other interrupt request is present for an enable priority level. When the wait state is ended because of an interrupt request, priority level dispatching is resumed as if the interrupt request were present at the completion of the last instruction.

An interruption is defined as the action performed by the PCE when control is taken from one PSV/ACV pair and given to another PSV/ACV pair. The program associated with the PSV/ACV pair from which control is taken is called the interrupt program. Interruptions occur when the PCE's dispatching mechanism determines that a new PSV/ACV pair is to be introduced (a new program given control), whether at the current priority level or at a higher level. The interruption action is performed automatically.

The interrupt action includes storing the current PSV, updating certain control information, and introducing a new PSV and ACV. Information from the current PSV is stored in the register locations from which the PSV was loaded. The current ACV is not stored because its contents cannot be changed during program execution. Processing resumes as specified by the new PSV/ACV pair. This interruption action is performed automatically by the PCE; no action by the program is necessary to store PSV information or introduce a new PSV/ACV pair.

The stored PSV holds all necessary PCE-status information relative to the program being executed at the time of the interruption. When program execution is interrupted because of requests not associated with errors, the stored PSV contains the address of the instruction to be executed next. This permits automatic resumption of the interrupted program.

When an interruption occurs as a result of a program exception or system check information is stored in the PSV that permits identification of the instruction being executed when the interruption occurred. When appropriate, this information can also be used for resumption of the interrupted program. The cause is identified by additional information made available to the program. The specific information and its location depends on the interruption type.

The transfer of information between an I/O device in the I/O subsystem and main storage, or between and I/O device and a register in the processor is referred to as an input/output operation. Two methods may be used to transfer data to or from an I/O device. They are called programmed I/O and channel I/O.

Programmed I/O (PIO) refers to the transfer of a single unit of data between the I/O device and the PCE. Specifically, the transfer occurs between the I/O device and a general register designated in an I/O instruction. PIO is used to selectively reset I/O devices, and to read and modify device-status information. It is also used when listing I/O device operations are to be directly controlled by the program. Three I/O instructions are provided. Two of the instructions transfer a single byte of data to or from the I/O device; and the third instruction transfers a single halfword. I/O instructions can be executed only by a program that has the proper authorization indicated in the program-mode field of its PSV.

Channel I/O (CHIO) refers to the transfer of multiple units of data between the I/O device and main storage. CHIO is used principally for transferring information at a high data-rate. After the program initiates a CHIO operation, the program is free to perform other work; that is, the channel transfers data asynchronously with respect to program execution. The internal facilities of the PCE may be shared by the channel for controlling CHIO operations. This sharing is accomplished automatically and the program is not affected except for an increase in execution time.

Each PIO instruction specifies an 8-bit device address, an 8-bit command, and a general-register operand location from or into which data is transferred. Execution of an I/O instruction consists of the logical selection (connection) of the addressed device, the transfer of the command to the device, and the transfer of one unit of data to or from the device. Execution of the I/O instruction is completed after the data unit is transferred. The condition indicators in the current PSV are set to reflect the outcome of the PIO operation. When the channel detects an error during the execution of an I/O instruction, a system-check interruption is generated.

Channel I/O operations are used to transfer multiple units of data between main storage and I/O device. The channel synchronizes the transfer of data to or from main storage.

The facilities in the channel may be shared by a number of concurrently operating I/O devices. Each concurrently operating device obtains a time interval during which one or more units of data are transferred. The length of the interval depends on the operating characteristics of the device, such as the number of bytes in a burst and the device transfer rate. During such an interval, only one device is logically connected to the channel.

The program initiates a CHIO operation with an I/O instruction. The PIO command code designated by the I/O instruction is interpreted by the device as the initiation of a CHIO operation. The command code that initiates a CHIO operation depend on the specific device.

Three elements of information are normally required to control a CHIO operation: the command, the beginning logical address main-storage, and the data count. Control information may be supplied to the device by means of one or more I/O instructions executed before initiating the CHIO operation. Alternatively, control information may be written to the device as data during a CHIO operation.

Operations such as reading or writing data and reading or writing address information can be specified by the CHIO command. The beginning main-storage address is obtained by specifying the number of a channel pointer that contains the logical address.

A channel pointer is used by the channel during CHIO operations to address main storage, 64 channel pointers being provided for CHIO operations. Each channel pointer is permanently assigned to one of the principal registers from sets 8–15. During a CHIO operation, the channel maintains and updates the logical address in the channel pointer.

The initial address in the channel pointer designates the location in main storage from or into which the channel transfers the first byte of data. The address can supplied by a supervisory program or read from the I/O device during a CHIO operation. Storage locations are used in ascending order of addresses. As information is transferred to or from main storage, the address in the channel pointer is incremented by the channel. When the operation is concluded, the channel has increased the address in the channel pointer by an amount equal to the number of bytes transferred to or from main storage.

The channel pointer is associated with an ACV. All main storage addresses used by the channel are treated as logical addresses. The ACV defines the logical address space used by the channel during the transfer of data to or from main storage. During each storage reference, the logical address is relocated by means of the dynamic-address-relocation facility. When address translation is designated in the ACV, the relocated address is then translated to a read address by means of the dynamic-address-translation facility. Otherwise, the relocated address is used as the real address.

Normally, CHIO operation lasts until the final unit of information is transferred to or from the device. However, when the channel recognizes an exception or detects equipment malfunctioning, it terminates the data transfer immediately, logically disconnects the device, and generates a system-check interruption. When a channel I/O operation is ended, the conclusion may be signaled by the device with an I/O interruption. For devices that do not generate an I/O interruption, the conclusion may be determined by programmed interrogation.

At the conclusion of an operation, the device status includes information that indicates conditions pertaining to the execution of the CHIO operation. This status information is stored in the device's basic status register. Additional status information, if any, is stored in device-specific status registers. Status information may be obtained by the program by execution of one or more PIO commands that read the status information.

In program execution, an instruction is fetched from the location designated by the instruction address in the current PSV. The instruction address is then increased by the number of bytes in the fetched instruction in order to address the next instruction in sequence. The fetched instruction is then executed, and the same steps are repeated using the new value of the instruction address. However, the two sequences of steps overlap providing instruction prefetching.

The normal sequential execution of instructions may be changed by use of branching operations in order to perform subroutine linkage, decision-making, and loop control.

Sequential execution of instructions is also changed when a new PSV is introduced.

INSTRUCTION EXECUTION

To illustrate the manner in which the PROC, MASS and CHAN chips cooperate to execute instruction, three instruction types will be discussed;

(a) Register to Register Instruction;
(b) Branch instructions; and
(c) Shift/Rotate instructions

Register to Register
Last Cycle of the Previous Instruction

| | |
|---|---|
| MASS Chip: | Completes execution of the previous instruction. |
| | Loads the current instruction into the instruction register. |
| | Decodes the next instruction. |
| PROC Chip: | Completes execution of the previous instruction. |
| | Loads the current instruction into the instruction register. |
| | Decodes the next instruction. |
| CHAN Chip: | Completes execution of the previous instruction. |
| | Loads the current instruction into the instruction register. |
| | Decodes the next instruction. |
| | Stores results. |
| | Loads next instruction from instruction buffer into instruction register. |
| | Decodes next instruction. |
| | Loads prefetched instruction into instruction buffer. |
| CHAN Chip: | Loads next instruction from instruction buffer into instruction register. |
| | Decodes next instruction. |
| | Loads prefetched instruction into instruction buffer. |

Branch (Taken)
Last cycle of the Previous Instruction

| | |
|---|---|
| MASS Chip: | Completes execution of the previous instruction. |
| | Loads the current instruction into the instruction register. |
| | Decodes the next instruction. |
| PROC Chip: | Completes execution of the previous instruction. |
| | Loads the current instruction into the instruction register. |
| | Decodes the next instruction. |
| CHAN Chip: | Completes execution of the previous instruction. |
| | Loads the current instruction into the instruction register. |
| | Decodes the next instruction. |

First cycle of the Current Instruction

| | |
|---|---|
| MASS Chip: | Fetches branch address (hi-order). |
| PROC Chip: | Fetches branch address (lo-order) and sends to MASS. |
| | Tests branch condition and indicates result to MASS and CHAN. |
| CHAN Chip: | Samples interrupt requests and prioritizes. |

Second cycle of the Current Instruction

| | |
|---|---|
| MASS Chip: | Fetches branch address translation table entry. |
| PROC Chip: | No-op. |
| CHAN Chip: | No-op. |

Third cycle of the Current Instruction

| | |
|---|---|
| MASS Chip: | Translates branch address and fetches larger instructions. |

-continued

|  | Increments instruction address counter. Load target instruction into instruction buffer. Generates EXIT signal. |
|---|---|
| PROC Chip: | Load target instruction into instruction buffer. Generates EXIT signal. |
| CHAN Chip: | Samples interrupt requests and prioritizes. Loads target instruction into instruction buffer. Generates EXIT signal. |

Fourth Cycle of the Current Instruction

| MASS Chip: | Prefetches from next instruction buffer. loads target instruction into instruction register. loads next instruction into instruction buffer. |
|---|---|
| PROC Chip: | loads target instruction into instruction register. loads next instruction into instruction buffer. |
| CHAN Chip: | Loads target instruction into instruction register. loads next instruction into instruction buffer. |

Shift/Rotate
Last cycle of the Previous Instruction

| MASS Chip: | Completes execution of the previous instruction. Loads the current instruction into the instruction register. Decodes the next instruction. |
|---|---|
| PROC Chip: | Completes execution of the previous instruction. Loads the current instruction into the instruction register. Decodes the next instruction. |
| CHAN Chip: | Completes execution of the previous instruction. Loads the current instruction into the instruction register. Decodes the next instruction. |

First cycle of the Current Instruction

| MASS Chip: | no-op. |
|---|---|
| PROC Chip: | Fetches SHIFT/ROTATE operand and loads into shift register. |
| CHAN Chip: | Samples interrupt requests and prioritizes. |

Second cycle of the Current Instruction

| MASS Chip: | no-op. |
|---|---|
| PROC Chip: | SHIFTS/ROTATES operand by one-bit. Decrements SHIFT/ROTATE counter. Tests SHIFT/ROTATE counter for zero If ≠ 0 do cycle 2, if = 0 do cycle 3. |

(note: this cycle repeats until SHIFT/ROTATE counter = 0)
Third cycle of the Current Instruction

| MASS Chip: | Increments instruction address counter. Generates EXIT signal. |
|---|---|
| PROC Chip: | Tests result of shift/rotate. Sets condition codes. Generates EXIT signal. |
| CHAN Chip: | Samples interrupt requests and prioritizes. Generates EXIT signal. |

Fourth cycle of the Current Instruction

| MASS Chip: | Prefetches instruction. Loads next instruction from Instruction Buffer to Instruction Register and decodes. Loads prefetched instruction into Instruction Buffer. |
|---|---|
| PROC Chip: | Stores results of SHIFT/ROTATE. Loads next instruction from Instruction Buffer to Instruction Register and decodes. Loads prefetched instruction. |
| CHAN Chip: | Loads next instruction from Instruction Buffer to Instruction Register and decodes. Loads prefetched Instruction into |

-continued

Instruction Buffer.

Comments

Because instructions are prefetched, the labels "Previous", "Current", "Next" and "TARGET" have been used to distinguish between the various instructions in the data flow and it is possible to argue at which precise point the execution cycle of the current instruction starts and finishes and thus what comprises a terminal function. The EXIT signal is fixed in relation to the cycle of the instruction register and is generated just before it is reloaded with the next instruction even though various operations of the current instruction are performed at the same time as the instruction register is reloaded. If there were no prefetching, all operations associated with the current instruction would be complete at generation of the EXIT signal.

The instruction address counter is part of the active PSV and is a logical counter, not a physical counter.

The shift/rotate counter is, similarly, a field of the instruction.

The shift/rotate operand is fetched from a half register and the result is stored in the same half register.

The ALU is only quarter a register wide so that two passes are required to execute a logical or arithmetic operation on half register wide operands.

Hardware Summary

Little need be detailed of the hardware as a whole, it being the control arrangements which are material to the present invention, these being considered hereinafter. It is pointed out, however, that the register space 31 contains all the registers specified by the system, the register sets required for current operations being paged into a register cache under the control of the PROC chip 26. However, only half of each cache register resides in the PROC chip, the other half residing in the MASS chip 28. Bus 60 provides a fast path for half register contents from the PROC chip to the MASS chip when required. The PROC chip 26 houses a shift unit in addition to the half register wide arithmetic and logic unit (ALU). The MASS chip 28 houses an adder for generating addresses and a translation table look up mechanism. The CHAN chip 30 houses the I/O control logic but requires the services of the other chips for accessing memory 20 and the registers for I/O to storage/register operations. Barring the housing of the register cache on two chips and the control arrangement, the hardware is conventional.

Chip Control—Instruction

Instruction execution on each of the PROC, MASS and CHAN chips 26, 28 and 30 is effected in the same manner. The control arrangement on each chip is similar to that in United Kingdom Patent Specification No. 1,225,253 as applied to the totality of processing modules in that the current instruction is partially decoded in common for the chip and independently and specifically further decoded for selected chip sub-functions. The hardware used in the embodiment comprises an aggregation of program logic arrays (PLA), conventional per se, in the manner, indicated diagrammatically, in FIG. 4 for any of the three chips. On each chip, there is an instruction buffer register 80 connected to an instruction register 82, that part of the instruction register 82 designed to receive the OPCODE being connected, in turn, to a PLA sequencer 84. The instruction buffer register 80 is connected to the system data bus 34 and the sequencer 84 is connected to the system clocks via line 58. The output signals from sequencer 84 are fed back to the sequencer as inputs and are also supplied in parallel as inputs to a plurality of PLA sub-controllers 86, 88. The sequencer 84 performs the common partial decoding and the sub-controllers 86, 88 generate only the control signal patterns required by the sub-functions which they control. Collectively, the sequencer 84 and the sub-controllers 86, 88 comprise the primary controller (12a to 12n in FIG. 1) for that chip, there being one such arrangement in each chip.

Figure 4:
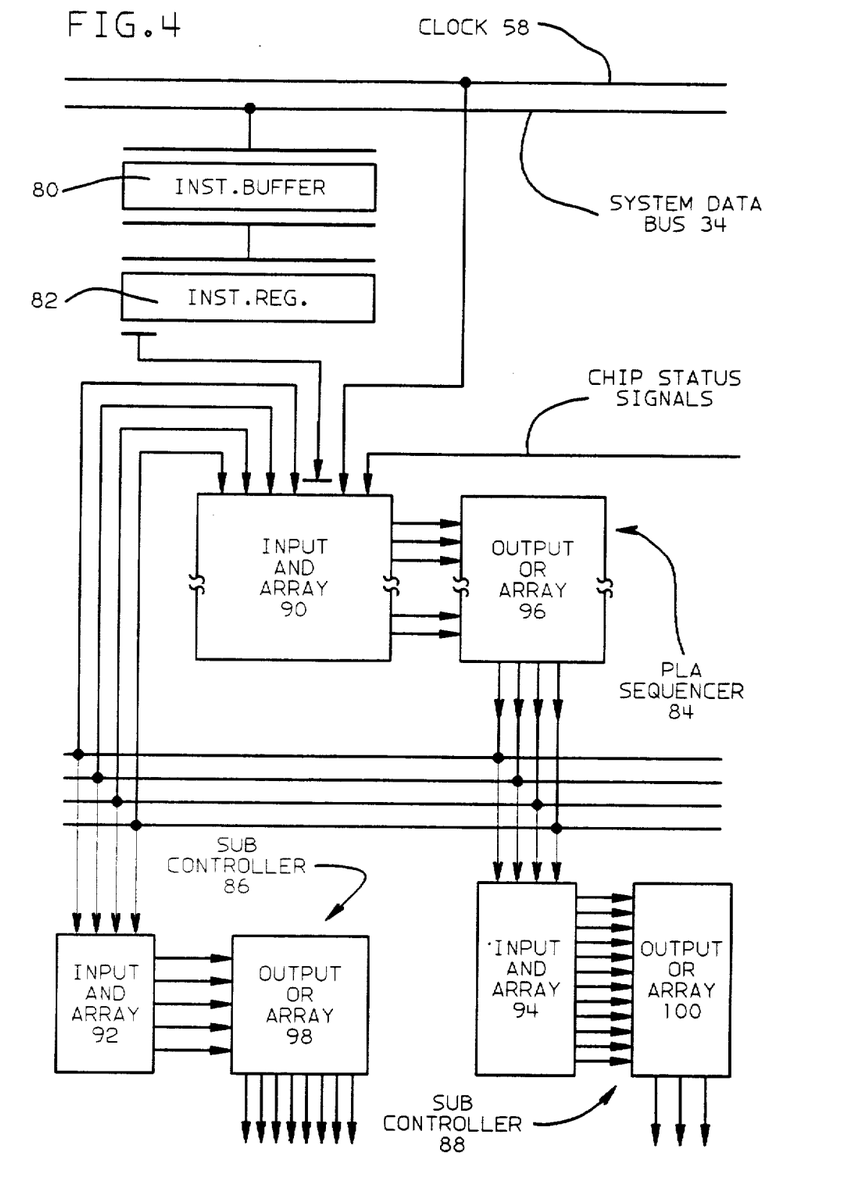
FIG. 4 is a block diagram of the primary controller of any one processing chip of the processor of FIG. 3.

The PLA's are conventional and comprise and input AND array 90, 92, 94, internally connected to an output OR array 96, 98, 100. In each case, the AND array will generate significant signals on the internally connections to the OR array, if and only if, the input signal patterns to the AND array match at least one set of logical connections of the AND array. The OR array produces output signals which are functions of the significant signals supplied by the connected AND array as combined by the logical connections internally of the OR array.

Thus, if there is no AND array match, there will be no OR array output so that ineffective AND array logical connections are not required. Equally, since the subcontroller 86, 88 control individual subfunctions, their OR arrays need have only the necessary and sufficient number of output lines to supply the control signal set for the associated sub-function. As illustrated in FIG. 4 and it is emphasized that the showing is merely conceptual, PLA 86 is shown as matching 5 input combinations and producing eight output signals while PLA 88 is shown as matching twelve input combinations but producing only three output signals. PLA 84 is shown as matching a large but unspecified number of input patterns and producing four output signals.

In addition to the OPCODE, system clocks and its own output, sequencer 84 also receives, as input, chip status signals from latches within the chip. Its function is to generate a sequence of machine states represented by its output signal patterns. Thus

MACHINE STATE N=(MACHINE STATE
N−1; OPCODE; STATUS; CLOCK)

while

CONTROL SIGNAL PATTERN=(MACHINE
STATE P+MACHINE STATE Q+MACHINE
STATE R)

The EXIT signal is generated by the sequencer 84.

If, however, any processing chip operates abnormally, it is not sufficient to rely on clock control alone to preserve processor synchronism at the instruction level and it is to this latter form of synchronization the present invention directs itself.

Since each of the PROC, MASS and CHAN chips decodes the current instruction independently of the other chips, control by clock alone could result in incomplete execution by any of the chips in a manner not readily or immediately detectable by conventional mechanisms. Insertion of a new instruction after the appropriate number of processor cycles may well produce results detectable only by human study of the output from the processor. Accordingly each processing chip is arranged to generate an EXIT signal when its controller completes or considers itself to have completed execution of the current instruction. A synchronization error can be detected by comparison of the EXIT signals, but this, of itself, is not sufficient.

As explained in detail in the aforesaid manual, the processor has eight interrupt levels associated with different classes of system tasks. Thus, in general, to change tasks and, particularly, to change from executing a problem program to executing a diagnostic routine as would be required in the case of an error not recoverable by simple retry, it is necessary to switch from operating at one interrupt level to operating at another interrupt level, and it requires execution of instructions to so switch. If for some reason, one or more of the PROC, MASS and CHAN chips fail to complete execution of the current instruction, it is necessary for each of the chips to be driven to a condition in which the switch can be performed without masking the circumstances occasioning the switch, and, further, such preparatory operations need to be performed independently in each chip and without using the normal controller, since this, of itself, would need a new instruction to be inserted.

Chip control—Error

Figure 5:
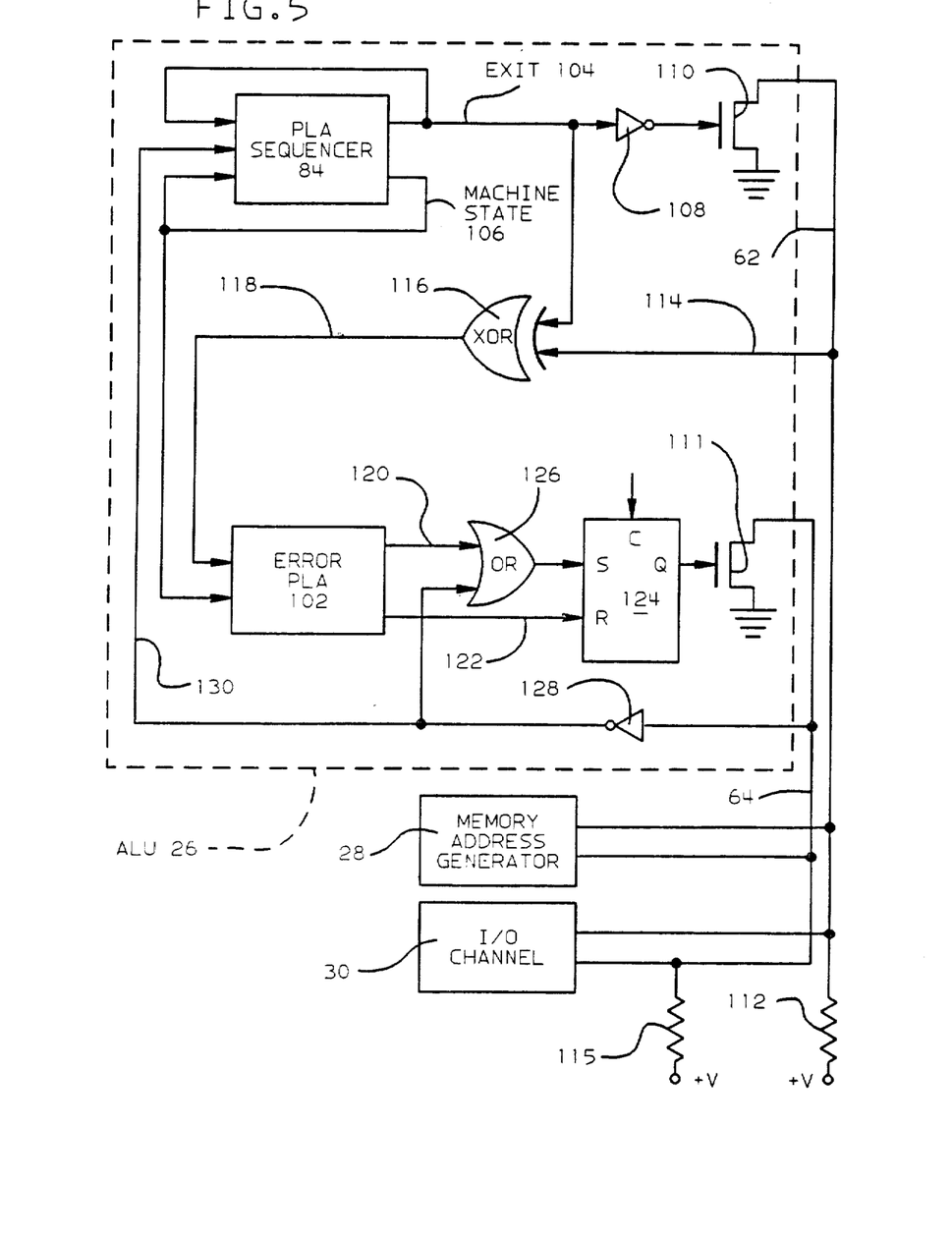
FIG. 5 is a diagram of the secondary controller structure of the processor of FIG. 3.

In the case of an error, chip control is assumed by the secondary controller (14a to 14n in FIG. 1) comprised of the sequencer 84 of the primary controller and an ERROR PLA 102 (see FIG. 5). An independent sequencer could be used but sharing is more convenient.

As shown in FIG. 5, the sequencer 84 shown in detail, the others corresponding, has two outputs, a simple signal line (EXIT) 104 which is part of the primary controller machine state line bundle and multiple machine state signal line bundle 106 belonging to the secondary controller. Being machine state signal lines, all these lines are fed back to provide inputs to the sequencer. All the remaining primary controller inputs to the sequencer 84 have been omitted from the drawing. The EXIT line 104 connects, via an inverter 108 to an off-chip driver 110 connected between earth and the common external EXIT line 62, which terminates via a load 112 to +v. Thus common EXIT line 62 will be significant at +v if and only if each sequencer 84 is generating its own EXIT signal. Line 62 is connected back onto the chip via line 114 to XOR circuit 116, to which line 104 is couple as the second input. XOR circuit 116 provides an input on line 118 to ERROR PLA 102, the other inputs to which are supplied by sequencer 84 on line bundle 106.

ERROR PLA 102 provides output control signals to the chip logic (on lines not shown) together with SET and RESET outputs on lines 120 and 122 respectively connected, via OR circuit 26 in the case of SET line 120, a reset dominant ERROR latch 124. The set output of latch 124 connects via an earthed source of chip driver 111 to ERROR line 64, terminating in load 115 to +v. Thus common ERROR line 64 with significance at +v if and only if no ERROR latch 124 is set or, in other words, significant at earth if any ERROR latch 124 is SET. ERROR line 64 is connected back onto the chip via an inverter 128 which, is connected both to OR circuit 126 and, as an input on line 130 to sequencer 84. Thus, a local mismatch between the EXIT signal from sequencer 84 and the signal state of common EXIT line 62, detected by XOR circuit 116, as well as the setting of the ERROR latch 124 of either of the other chips will cause the local ERROR latch to be set and an ERROR signal input to be supplied on line 130 to sequencer 84. This is why, in FIG. 2, the branch question, determining whether an instruction loop or an ERROR loop is followed after EXIT, is "MISMATCH+ERROR?".

Lines 62 and 64, together, correspond to control bus 18 of FIG. 1.

Out-Of-Sync Error Cycle
Last cycle of Previous Instruction

| | |
|---|---|
| MASS Chip: | Completes execution of previous instruction |
| | Loads next instruction into Instruction Register and decodes |
| PROC Chip: | Completes execution of previous instruction |
| | Loads next instruction into Instruction Register and Decodes |
| CHAN Chip: | Completes execution of previous instruction |
| | Loads next instruction into Instruction Register and decodes |

(n-1 cycle of current instruction, as required, by all three chips, until . . .)

| | |
|---|---|
| MASS Chip | Generates EXIT signal |
| | Detects out-of-sync condition: internal EXIT ≠ external EXIT |
| PROC Chip: | Fails to generate EXIT signal |
| CHAN Chip: | Generates EXIT signal |
| | Detects out-of-sync condition: internal EXIT ≠ external EXIT |

Interim cycle (in which the next instruction is not loaded into the instruction buffers)

| | |
|---|---|
| MASS Chip: | Activates ERROR signal |
| PROC Chip: | Receives and latches ERROR signal |
| CHAN Chip: | Activates ERROR signal |

First cycle of resync and ERROR reporting sequence

| | |
|---|---|
| MASS Chip: | Resets ERROR latch |
| PROC Chip: | Resets ERROR latch |
| CHAN Chip: | Resets ERROR latch |

(Note: no unit proceeds from this point until all ERROR latches are reset.)

Second cycle

| | |
|---|---|
| MASS Chip: | no-op |
| PROC Chip: | no-op |
| CHAN Chip: | no-op |

Third cycle

| | |
|---|---|
| MASS Chip: | no-op |
| PROC Chip: | no-op |
| CHAN Chip: | Generates ERROR BLOCK INDEX (EBI) Address |

(Note: This address will be used to store reported errors in a predetermining location in memory 20)

Fourth cycle

| | |
|---|---|
| MASS Chip: | Receives EBI Address |
| PROC Chip: | no-op |
| CHAN Chip: | Sends EBI Address to MASS |

Fifth cycle

| | |
|---|---|
| MASS Chip: | Stores EBI Address in Temporary Register |
| PROC Chip: | no-op |
| CHAN Chip: | Reports Process Check Errors |

Sixth Cycle

| | |
|---|---|
| MASS Chip: | no-op |
| PROC Chip: | no-op |
| CHAN Chip: | Reports Machine Check Errors |

Seventh Cycle

| | |
|---|---|
| MASS Chip: | no-op |
| PROC Chip: | no-op |
| CHAN Chip: | no-op |

Eighth Cycle

| | |
|---|---|
| MASS Chip: | no-op |
| PROC Chip: | Reports Process Check Errors |
| CHAN Chip: | Receives Process Check Errors |

Ninth Cycle

| | |
|---|---|
| MASS Chip: | no-op |
| PROC Chip: | Reports Machine Check Errors |
| CHAN Chip: | Receives Machine Check Errors |

Tenth Cycle

| | |
|---|---|
| MASS Chip: | no-op |
| PROC Chip: | no-op |
| CHAN Chip: | no-op |

Eleventh Cycle

| | |
|---|---|
| MASS Chip: | Reports Process Check Errors |
| PROC Chip: | no-op |
| CHAN Chip: | Receives Process Check Errors |

Twelfth Cycle

| | |
|---|---|
| MASS Chip: | Reports Machine Check Errors |
| PROC Chip: | no-op |
| CHAN Chip: | Receives Machine Check Errors |

Thirteenth Cycle

| | |
|---|---|
| MASS Chip: | no-op |
| PROC Chip: | no-op |
| CHAN Chip: | Generates EIRV and PEC error status |

Fourteenth Cycle

| | |
|---|---|
| MASS Chip: | no-op |
| PROC Chip: | no-op |
| CHAN Chip: | no-op |

Fifteenth Cycle

| | |
|---|---|
| MASS Chip: | no-op |
| PROC Chip: | no-op |
| CHAN Chip: | no-op |

Sixteenth Cycle

| | |
|---|---|
| MASS Chip: | Stores EBI if an access error is detected |
| PROC Chip: | no-op |
| CHAN Chip: | no-op |

Seventeenth Cycle

| | |
|---|---|
| MASS Chip: | no-op |
| PROC Chip: | no-op |
| CHAN Chip: | no-op |

Eighteenth Cycle

| | |
|---|---|
| MASS Chip: | Fetches NSI translation entry if required |
| PROC Chip: | no-op |
| CHAN Chip: | no-op |

Nineteenth Cycle

| | |
|---|---|
| MASS Chip: | Fetches NSI and stores it in Instruction Buffer |
| PROC Chip: | Stores NSI in Instruction Buffer |
| CHAN Chip: | Stores NSI in Instruction Buffer and requests PSV SWAP to level 0 |

Twentieth Cycle

| | |
|---|---|
| MASS Chip: | Fetches NSI + 2 and decodes NSI/PSV SWAP |
| PROC Chip: | Decodes NSI/PSV SWAP |
| CHAN Chip: | Decodes NSI/PSV SWAP |

First cycle of PSV SWAP to level 0 if not currently executing on level 0.

Thus, when a synchronization error is detected by any chip, an OUT-OF-SYNC signal is activated by that chip. This in turn causes its ERROR CONTROL PLA to activate the SET-ERROR signal which is latched into the ERROR latch through the feedback configuration. The feedback mechanism uses the ERROR signal on the ERROR line which interconnects all the chips in the system and the activation of this signal ('−') causes the ERROR latch of each chip to be set. The ERROR signal internal to each chip inputs to the SEQR PLA of each chip and when the ERROR signal is active, each SEQR PLA will complete the current operation and be put into an ERROR state. Each ERROR CONTROL PLA receives the MACHINE-STATE output of the SEQR PLA on each chip and when it recognizes the first substate of the ERROR state, will subsequently activate its RESET-ERROR signal. Since the ERROR latch is reset dominant, this will cause each chip to act to release the external ERROR signal ('+'). When ERROR has been deactivated ('+') the internal ERROR signal of each chip will be inactivate ('−'). These states of external ERROR and internal ERROR will not be attained until all chips have reached the first state of the ERROR state. Any chip which reaches the first state of the ERROR state will remain in this state until all other chips have reached this same state as indicated by the deactivation of ERROR line. Once this state is achieved, the chips proceed synchronously through the states of the ERROR routine. Consequently, this mechanism serves both to both report an out-of-sync error and to resynchronize the chips for the reporting of the error details and any subsequent operations associated with error detection and handling.

We claim:

1. A method of synchronizing operation of a plurality of modules comprising a processing system, comprising the steps of:

decoding in each of said plurality of modules a current instruction independently of each other said module;

generating an EXIT signal in each module upon completion of execution of said decoded instruction by said module;

sampling in each said module the EXIT signal state of all of said modules at a predetermined time;

detecting in each said module the absence of one or more of said EXIT signals from said modules at said predetermined time; and setting each said module to a predetermined state in response to said detection of absence of an EXIT signal from one or more of said modules at a predetermined time.

2. A method according to claim 1, further comprising the step of:

exiting to a program execution state controlled by an instruction upon detection of the presence of all said EXIT signals.

3. A method according to claim 2, further comprising the steps of:

generating a local ERROR signal in response to each said EXIT signal state detection;

monitoring ERROR signal states of each other said module;

generating a local error signal in another module in response to a detected externally generated ERROR signal;

setting all said modules to a predetermined state after said local ERROR signal is generated;

resetting said locally generated ERROR signal when said predetermined state is attained; and detecting absence of externally generated ERROR signals and, responsive thereto, sequencing said module through a predetermined ERROR routine before exiting to instruction controlled program execution.

4. Apparatus for synchronizing a plurality of processing modules in a processing system wherein each said module decodes a current instruction independently of each other module and wherein each said module generates an EXIT signal at the completion of execution of each instruction, comprising:

an EXIT signal path interconnecting all said modules;

generating means in each said module for applying an internally generated EXIT signal, when generated, to said EXIT signal path such that said EXIT signal path states are logical functions of said EXIT signal states;

monitoring means in each said module connected to the EXIT signal path for detecting inequality between said internally generated EXIT signal state and said EXIT signal path state after the internally generated EXIT signal is applied to the EXIT signal path; and means responsive to such inequality detection for forcing the module which detects the inequality into a predetermined state, independent of any other said modules.

5. Apparatus for synchronizing a plurality of processing modules in a processing system wherein each said module decodes a current instruction independently of each other module and wherein each said module generates an EXIT signal at the completion of execution of each instruction, comprising:

an instruction dependent primary controller in each module for executing said each instruction and generating said EXIT signal;

EXIT signal distribution means connected to said primary controller in each module for communicating EXIT signals, when generated, between said modules;

detecting means in each said module, connected to said EXIT signal distributing means and to said primary controller for generating a first output signal if said primary controller is generating an EXIT signal and at least one other said module is not generating such an EXIT signal, at a predetermined time; and a secondary controller in each module connected to said detecting means of such module and activated by said first output from said detecting means.

6. Apparatus according to claim 5, wherein said EXIT signal distributing means further comprises:

an EXIT signal bus;

first means in each module connecting said primary controller to said EXIT signal bus such that said EXIT signal bus is in a first binary state if all said primary controllers are generating EXIT signals and in a second binary state if any of said primary controllers are not generating an EXIT signal at a predetermined time;

second means connecting said EXIT signal bus to each said module, independent of said primary controllers;

said detecting means in each said module being connected to both said first means and said second means of said module; and said secondary controller generating an error signal in response to said second binary state of said EXIT signal bus.

7. Apparatus according to claim 6 further comprising:

an error latch in each said module connected to said secondary controller of such module to be set to a first state in response to said error signal therefrom; and a common error bus connected to an output of each said error latch such that said common error bus is in a first binary state if no error signal is generated and in a second binary state if any error signal is generated;

said common error bus being connected to an input of each said error latch such that each said error latch is set in response to said second binary state of said common error bus;

said secondary controller is activated in response to said second binary state of said common error bus.

8. Apparatus according to claim 7, wherein:

each said secondary controller, when activated, drives an associated module to a predetermined state and thereafter, resets its connected error latch and maintains a wait state; and each said secondary controller being responsive to a first binary state of said common error bus, when in said wait state to continue sequencing through a predetermined error routine and then exiting to transfer execution control to said primary controller.

9. Apparatus for synchronizing a plurality of processing modules in a processing system wherein each said module decodes a current instruction independently of each other module and wherein each said module generates an EXIT signal at the completion of execution of each instruction, comprising:

EXIT signal distributing means connected to a primary controller in each module for communicating EXIT signals when generated between said plurality of modules each module integrated in an integrated circuit chip;

said EXIT signal distributing means further comprising:

an EXIT signal bus;

first inverting means connecting said primary controllers to said EXIT signal bus such that said EXIT signal bus is in a first binary state if all said primary controllers are generating EXIT signals and in a second binary state if any said primary controller is not generating an EXIT signal, at a predetermined time;

second inverting means connecting said EXIT signal bus to each said integrated circuit chip;

detecting means in each said integrated circuit chip connected to said first and second inverting means for generating a predetermined output if said primary controller is generating an EXIT signal and said EXIT bus is in said second binary state; and a secondary controller in each said chip connected to said detecting means and turned on by said predetermined output from said detecting means to drive said chip to a predetermined state independent of said primary controller.

10. Apparatus according to claim 9, wherein:

said secondary controller generates an error signal when it is turned on;

said apparatus further comprising:

an error latch in each said chip connected to said secondary controller of said chip to be set in response to an error signal therefrom, said error latch falling to a reset state when set and reset conditions are presented and simultaneously removed from inputs to said error latch; an error bus connected to an output of each said error latch such that said error bus is in a first binary state if no error signal is being generated and in a second binary state if any error signal is being generated;

said error bus being connected to a set input of each said error latch such that each said error latch is set in response to said second binary state of said error bus;

said error bus being connected to said secondary controller to turn on said secondary controller when said error bus is in said second binary state; each said secondary controller, when turned on, driving said chip to a predetermined state, and resetting the associated error latch;

each said secondary controller being responsive to said first binary state of said error bus, to sequence through a predetermined error routine and then exiting to transfer execution control to said primary controller on said chip.

* * * * *